US012423683B2

(12) United States Patent
Walters et al.

(10) Patent No.: US 12,423,683 B2
(45) Date of Patent: *Sep. 23, 2025

(54) SYSTEM AND METHOD FOR CREATING A SECURE MESH NETWORK UTILIZING THE BLOCKCHAIN

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 530 days.

This patent is subject to a terminal disclaimer.

(21) Appl. No.: 16/786,515

(22) Filed: Feb. 10, 2020

(65) Prior Publication Data

US 2020/0175505 A1 Jun. 4, 2020

Related U.S. Application Data

(63) Continuation of application No. 16/182,184, filed on Nov. 6, 2018, now Pat. No. 10,636,030.

(51) Int. Cl.
*G06Q 20/38* (2012.01)
*G06Q 20/06* (2012.01)
(Continued)

(52) U.S. Cl.
CPC ......... *G06Q 20/382* (2013.01); *G06Q 20/065* (2013.01); *G06Q 20/3678* (2013.01);
(Continued)

(58) Field of Classification Search
CPC ............. G06Q 20/389; G06Q 20/3678; G06Q 20/382; G06Q 20/065; H04L 9/14; H04L 9/50; H04W 84/18
See application file for complete search history.

(56) References Cited

U.S. PATENT DOCUMENTS 5,892,900 A * 4/1999 Ginter ................. G06F 21/78
726/26
6,868,160 B1 * 3/2005 Raji ................. H04L 9/3247
380/282

(Continued)

FOREIGN PATENT DOCUMENTS

CN 106779636 A 5/2017

OTHER PUBLICATIONS

R. Tennekoon, J. Wijekoon, E. Harahap, H. Nishi, E. Saito and S. Katsura, "Per hop data encryption protocol for transmission of motion control data over public networks," 2014 IEEE 13th International Workshop on Advanced Motion Control (AMC), 2014, pp. 128-133, doi: 10.1109/AMC.2014.6823269.*

(Continued)

*Primary Examiner* — Steven S Kim
(74) *Attorney, Agent, or Firm* — KDW Firm PLLC

(57) ABSTRACT

Techniques for providing a secure mesh network based on a cryptocurrency blockchain are provided. An electronic device can receive data from a mesh network to establish the device as a node on the mesh network. The established node can generate a cryptocurrency wallet that can be loaded with an amount of cryptocurrency. The established node can receive a payment for facilitating transfers on the mesh network including routing transactional or communication data. Public and/or private keys associated with the cryptocurrency wallets can be used to encrypt communications, thereby providing a secure mesh network. Further, the blockchain, which can be managed by one or more authorized nodes of the mesh network, can provide a payment system within the mesh network. The distributed nature of the mesh network allows it to operate securely without a central authority. In turn, the mesh network is more adaptable and flexible.

20 Claims, 9 Drawing Sheets

(51) Int. Cl.
  *G06Q 20/36* (2012.01)
  *H04L 9/14* (2006.01)
  *H04W 84/18* (2009.01)
  *H04L 9/00* (2022.01)

(52) U.S. Cl.
  CPC .............. *G06Q 20/389* (2013.01); *H04L 9/14* (2013.01); *H04W 84/18* (2013.01); *H04L 9/50* (2022.05)

(56) References Cited

U.S. PATENT DOCUMENTS

| | | | | |
|---|---|---|---|---|
| 7,801,030 | B1* | 9/2010 | Aggarwal | H04L 12/4641 370/227 |
| 10,068,228 | B1* | 9/2018 | Winklevoss | H04L 9/3239 |
| 10,579,994 | B1* | 3/2020 | Walters | G06Q 20/223 |
| 10,636,030 | B1* | 4/2020 | Walters | G06Q 20/065 |
| 2003/0056093 | A1* | 3/2003 | Huitema | H04L 61/45 713/156 |
| 2006/0120387 | A1 | 6/2006 | Yang | |
| 2006/0176834 | A1* | 8/2006 | Dickerson | H04N 7/185 370/352 |
| 2006/0268766 | A1* | 11/2006 | Rangarajan | H04W 8/26 370/406 |
| 2007/0038743 | A1* | 2/2007 | Hellhake | H04W 40/26 709/224 |
| 2007/0147620 | A1* | 6/2007 | Zheng | H04L 9/0891 380/277 |
| 2007/0230689 | A1* | 10/2007 | Van Broeck | H04L 67/53 380/30 |
| 2007/0248047 | A1* | 10/2007 | Shorty | H04L 12/2838 370/329 |
| 2008/0304485 | A1* | 12/2008 | Sinha | H04W 40/246 370/392 |
| 2009/0060192 | A1* | 3/2009 | Budampati | H04W 12/03 380/278 |
| 2010/0115272 | A1* | 5/2010 | Batta | H04L 63/0464 713/162 |
| 2010/0317420 | A1* | 12/2010 | Hoffberg | G06Q 30/0282 463/1 |
| 2010/0318468 | A1* | 12/2010 | Carr | G06Q 20/40 705/79 |
| 2015/0244484 | A1* | 8/2015 | Tyson | H04J 3/0661 370/328 |
| 2015/0332256 | A1* | 11/2015 | Minor | G06Q 20/381 705/69 |
| 2016/0203522 | A1 | 7/2016 | Shiffert | |
| 2016/0283920 | A1 | 9/2016 | Fisher | |
| 2016/0300223 | A1* | 10/2016 | Grey | G06Q 20/3825 |
| 2017/0005804 | A1* | 1/2017 | Zinder | G06F 21/6254 |
| 2017/0078493 | A1* | 3/2017 | Melika | H04M 15/60 |
| 2017/0134937 | A1* | 5/2017 | Miller | G06Q 20/3829 |
| 2017/0201503 | A1 | 7/2017 | Jayasena | |
| 2017/0337534 | A1 | 11/2017 | Goeringer et al. | |
| 2017/0357966 | A1* | 12/2017 | Chandrasekhar | G06Q 20/3829 |
| 2018/0018723 | A1 | 1/2018 | Nagla et al. | |
| 2018/0109541 | A1* | 4/2018 | Gleichauf | H04W 8/24 |
| 2018/0204213 | A1* | 7/2018 | Zappier | H04L 63/065 |
| 2018/0216946 | A1* | 8/2018 | Gueye | G01C 21/3617 |
| 2018/0255591 | A1* | 9/2018 | Valicherla | H04L 12/4641 |
| 2018/0337769 | A1* | 11/2018 | Gleichauf | H04L 9/0637 |
| 2019/0042228 | A1* | 2/2019 | Nolan | G06F 8/65 |
| 2019/0228133 | A1 | 7/2019 | Ansari | |
| 2019/0303363 | A1* | 10/2019 | Leung | G06F 16/2465 |
| 2020/0059353 | A1 | 2/2020 | Liu et al. | |
| 2020/0074437 | A1 | 3/2020 | Bonsi | |
| 2020/0111066 | A1* | 4/2020 | Anstey | H04L 67/104 |
| 2020/0120023 | A1 | 4/2020 | Munson et al. | |

OTHER PUBLICATIONS

Anonymous: "Wireless mesh network—Wikipedia, the free encyclopedia", Feb. 8, 2014 (six (6) pages).

Kishigami et al., "The Blockchain-based Digital Content Distribution System", 2015 IEEE Fifth International Conference on Big Data and Cloud Computing, Aug. 1, 2015, pp. 187-190. DOI:10.1109/BDCloud.2015.60.

* cited by examiner

SYSTEM AND METHOD FOR CREATING A SECURE MESH NETWORK UTILIZING THE BLOCKCHAIN

RELATED APPLICATION

This application is a continuation of U.S. patent application Ser. No. 16/182,184, titled "SYSTEM AND METHOD FOR CREATING A SECURE MESH NETWORK UTILIZING THE BLOCKCHAIN" filed on Nov. 6, 2018. The contents of the aforementioned application are incorporated herein by reference in their entirety.

TECHNICAL FIELD

Embodiments described herein generally relate to a secure mesh network.

BACKGROUND

Typically, for many conventional mesh networks, a central authority is required. The central authority often determines which participants are allowed to operate on the conventional mesh network and often maintains security on the conventional mesh network. Requiring a central authority to control the conventional mesh network can be overly restrictive, reducing the adaptability and flexibility of the network.

Accordingly, what is needed is a mesh network that can provide secure communications without the need for a central authority.

SUMMARY OF THE DISCLOSURE

This disclosure presents various systems, components, and methods related to using a blockchain within a mesh network. Each of the systems, components, and methods disclosed herein provides one or more advantages over conventional systems, components, and methods.

Various embodiments include techniques for providing a secure mesh network based on a cryptocurrency blockchain. Data relating to a mesh network can be received and stored by an electronic device such as, for example, a smartphone. The electronic device can be established as a node on the mesh network based on the stored received data. The established node can generate and store a cryptocurrency wallet. The established node can load the generated cryptocurrency wallet with an amount of cryptocurrency. The established node can receive a payment for facilitating transfers on the mesh network including routing transactional or communication data. Public and/or private keys associated with the cryptocurrency wallets can be used to encrypt communications, thereby providing a secure mesh network. Further, the blockchain, which can be managed by one or more authorized nodes of the mesh network, can provide a payment system within the mesh network. The distributed nature of the mesh network allows it to operate securely without a central authority. In turn, the mesh network is more adaptable and flexible. Other embodiments are disclosed and described.

DETAILED DESCRIPTION

Figure 1:
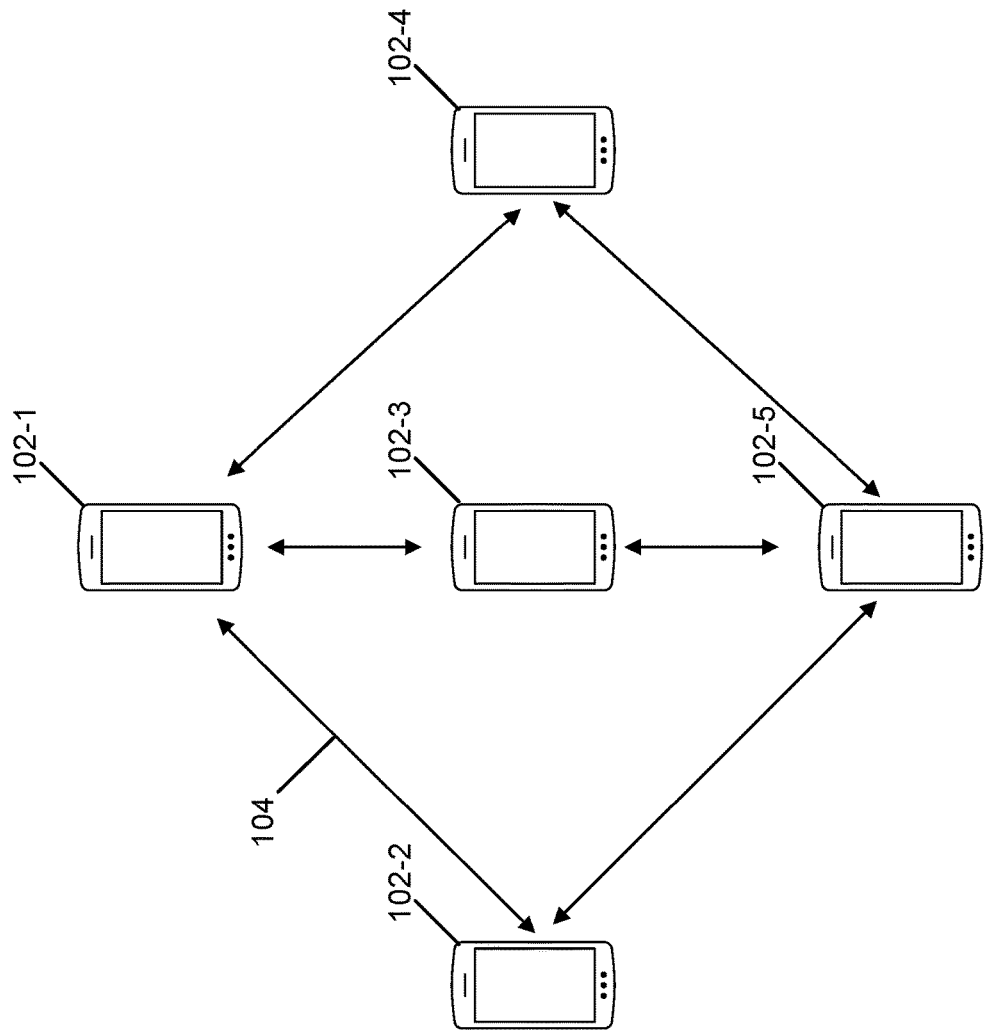
FIG. 1 illustrates an operating environment.

FIG. 1 illustrates an operating environment 100 such as may be representative of various embodiments in which techniques for providing a secure network may be implemented. The operating environment 100 can be a mesh network and can include a first node 102-1, a second node 102-2, a third node 102-3, a fourth node 102-4, and a fifth node 104-5 node. The mesh network 100 is not limited to the number of nodes depicted in FIG. 1.

In various embodiments, the mesh network 100 can be any type of mesh network and can operate according to any known mesh networking protocol or standard. In various embodiments, data, traffic, messages, or other communications within the mesh network 100 can be transmitted between the nodes 102 as described herein. In various embodiments, data, traffic, messages, or other communications within the mesh network 100 can be transmitted from an initial node to a desired recipient node through one or more intermediate nodes, with intermediate nodes passing communications intended for the desired recipient node to a next nearest neighbor or other node as described herein.

The mesh network 100 can be provided in an area without Internet access or with limited Internet access such as, for example, a farmer's market or a festival. The mesh network 100 can provide a payment system within the mesh network 100 that does not require each node 102 to be connected directly to the Internet. In various embodiments, one or more nodes 102 can maintain a blockchain for a cryptocurrency that can support a payment system useable within the mesh network 100 and that can support secure communications within the mesh network 100.

As an example, the node 102-1 and the node 102-5 can each be considered to be an authorized node on the mesh network 100. One or more of the authorized nodes 102-1 and 102-5 can maintain the blockchain for the cryptocurrency. One or more of the authorized nodes 102-1 and 102-5 can process transactions related to the blockchain including, for example, updating the blockchain based on a transaction and distribute the updated blockchain. Transactions can be conducted within the mesh network 100 and can utilize the cryptocurrency blockchain maintained by one or more of the nodes 102-1 and 102-5. Communications or other messages can be transmitted within the mesh network 100 using encryption features provided by the cryptocurrency and/or blockchain such that the communications or other messages can be provided in a secure manner.

The nodes 102-2, 102-3, and 102-4 can each be considered to be an unauthorized node. In various embodiments, as unauthorized nodes, the nodes 102-2, 102-3, and 102-4 can each route communications or other messages to an authorized node (e.g., the nodes 102-1 and 102-5) but cannot directly send messages to one another (e.g., the node 102-2 cannot directly send a message to the node 102-3). In various embodiments, as unauthorized nodes, the nodes 102-2, 102-3, and 102-4 may be allowed to receive and transmit communications, messages, or other traffic on a limited basis. In various embodiments, one or more of the authorized nodes 102-1 and 102-5 can determine the allowed level of participation on the mesh network 100 by the nodes 102-2, 102-3, and 102-4.

Path 104 can represent a communication path between certain nodes on the mesh network 100 (e.g., between the node 102-1 and the node 102-2). Other paths 104 between certain nodes are shown in FIG. 1 but are not labeled for simplicity. The path 104 can indicate that communication between certain nodes is allowed or possible within the mesh network 100. In various embodiments, communications between the authorized node 102-1 and the authorized node 102-5 can be provided through the node 102-3—for example, the node 102-3 can relay messages between the authorized nodes 102-1 and 102-5. In various embodiments, a communication path is not shown between the node 102-3 and the node 102-4 since each node is unauthorized and cannot directly send messages to one another. Instead, the nodes 102-3 and 102-4 may be allowed to perform only limited functions with respect to the mesh network 100 as described herein.

In various embodiments, each of the nodes 102 can be associated with a cryptocurrency wallet that can be loaded with an amount of cryptocurrency (e.g., cryptocurrency tokens). The authorized nodes 102-1 and 102-5 can issue the cryptocurrency wallets for the other nodes 102-2, 102-3, and 102-4. The authorized nodes 102-1 and 102-5 can also control access to the mesh network 100. As an example, the authorized nodes 102-1 and 102-5 can grant or deny a request by another node 102 (e.g., the node 102-2) to join and participate on the mesh network 100. In various embodiments, only authorized nodes can be associated with a cryptocurrency wallet.

The authorized nodes 102-1 and 102-5 can be designated as such in a number of manners. In various embodiments, a node 102 can be considered an authorized node 102 once it holds or stores a certain amount or value of cryptocurrency. In various embodiment, a node 102 can be considered an authorized node 102 once a certain number of other nodes 102 (e.g., authorized nodes) determine the node 102 should be an authorized node. In various embodiments, a node 102 can be considered an authorized node 102 once it helps facilitate a certain number of transactions using the blockchain (e.g., helps authorize transactions based on the blockchain).

In general, to become an authorized node, one or more criteria must be met as described herein. Once a node becomes an authorized node, the node can communicate in any manner with any other node of the mesh network 100, can manage participation of other nodes on the mesh network including, for example, issuing cryptocurrency wallets, and can manage a blockchain of the cryptocurrency. An authorized node can receive payments (e.g., based on the cryptocurrency) for processing transactions and maintaining the blockchain and can receive payments for routing communications and other messages through the mesh network 100.

In contrast, unauthorized nodes are generally limited to routing communications and other messages to authorized nodes. In various embodiments, unauthorized nodes can receive payments (e.g., based on the cryptocurrency) for helping to facilitate transactions within the mesh network 100—for example, by routing traffic carrying data related to a transaction toward an authorized node and by helping to authorize a transaction (e.g., when a desired cryptocurrency transaction requires authorization from multiple nodes for verification). In various embodiments, unauthorized nodes can also receive payments for routing communications and other messages through the mesh network 100 (e.g., subject to any routing limitations related to operating as an authorized node). In various embodiments, one or more of the authorized nodes 102-1 and 102-5 can be connected to the Internet and/or a remote network. In various embodiments, the one or more of the authorized nodes 102-1 and 102-5 can ensure that a maintained blockchain is up to date and accurate with versions of the blockchain maintained outside of the mesh network 100.

For purposes of illustration and explanation only, five nodes 102 are shown in FIG. 1, but the number of nodes 102 capable of operating on the mesh network 100 is not so limited as any number of nodes 102 can be included within the mesh network 100. The nodes 102 can represent any type of electronic and/or computing device maintained by an operator or user including, for example, a smartphone, a tablet, a laptop, or any other consumer electronic device capable of operating as a node 102 on the mesh network 100. The operator or user of any of the nodes 102 can be a private individual or can be a business owner or purveyor such that certain nodes 102 can represent a point of sale node (e.g., a node associated with the sale of a good or service). Accordingly, transactions can be conducted entirely within the mesh network 100 using the blockchain between a POS node and an individual node and/or between two individual nodes.

For purposes of discussion, operation of the node 102-2 is described in relation to joining the mesh network 100 and can be applicable to any other node 102 on the mesh network 100. In various embodiments, the node 102-2 can receive data or other information relating to the mesh network 100. In various embodiments, an application (app) or other program can be downloaded onto the node 102-2. The data or other information relating to the mesh network 100 and/or the downloaded app can be used to establish the electronic device and/or computing device as the node 102-2 on the mesh network 100. Other nodes 102 can also be established on the mesh network 100 in a similar manner.

After the computing device is established as the node 102-2 that is capable of operating on the mesh network 100, the node 102-2 can generate a cryptocurrency wallet. The generated cryptocurrency wallet can be stored on the node 102-2—for example, within a storage device and/or memory unit of the computing device established as the node 102-2. The cryptocurrency wallet for the node 102-2 can be issued by an authorized node of the mesh network such as, for example, the node 102-2 or the node 102-5.

After generating a cryptocurrency wallet, the user of the computing device operating as the node 102-2 can load the generated cryptocurrency wallet with an amount of cryptocurrency tokens. The amount of cryptocurrency tokens can be issued by an authorized node of the mesh network. As an example, the node 102-2 can provide a payment to the authorized node 102-1 in exchange for a corresponding amount of a cryptocurrency (e.g., cryptocurrency tokens). Other nodes 102 of the mesh network 100 can generate a cryptocurrency wallet and load the wallet with cryptocurrency in a similar manner.

In various embodiments, only authorized nodes are allowed to conduct financial transactions on the mesh network 100. In various embodiments, unauthorized nodes are allowed to also conduct financial transactions on the mesh network 100.

As an example, the authorized node 102-1 can conduct transactions within the mesh network 100 using cryptocurrency stored in a generated wallet. As an example, the node 102-1 can initiate and conduct a transaction with the node 102-5 (e.g., for a good or service offered by the node 102-5). Payment can be provided by the node 102-1 to the node 102-5 based on cryptocurrency stored in the generated wallet of the node 102-1. One or more authorized nodes—such as the node 102-1—can update and manage the blockchain to reflect the transaction between the node 102-1 and the node 102-5. Transactional data or information can be transferred between the nodes 102-1 and 102-5 to facilitate the transaction. One or more unauthorized nodes—such as the node 102-2—can transfer messages related to the transaction between the nodes 102-1 and 102-5. In doing so, the node 102-2 can receive a payment (e.g., from the node 102-1 and/or the node 102-5) for facilitating the transaction. Over time, in various embodiments, the node 102-2 can receive enough payments for supporting transactions to meet a requirement to be considered an authorized node on the mesh network 100.

In various embodiments, the unauthorized nodes 102-2, 102-3, and 102-5 (as well as the authorized nodes 102-1 and 102-5), can transmit and receive communications and/or other messages within the mesh network 100. As an example, the node 102-2 can generate and transmit communication messages within the mesh network 100. To do so, the node 102-2 can be required to issue a payment to each node 102 that helps facilitate transmission of the generated message from the node 102-2 as it is relayed through one or more intermediate nodes before reaching a desired destination node.

Further, the node 102-2 can be required to issue a payment to each node that helps facilitate a transaction initiated by the node 102-2. For example, the node 102-2 can be required to issue a payment to the authorized node 102-1 that manages the cryptocurrency blockchain and to issue a payment to any node 102 that helps transmit any messages between nodes 102 that conduct a transaction. For example, the node 102-3 may receive payment from the node 102-2 for transferring messages—for example, messages related to a communication or messages related to a transaction—between the nodes 102-2 and the node 102-4. In this way, each node 102 on the mesh network 100 can receive payments for facilitating transactions and/or communications between other nodes 102 on the mesh network 100.

In various embodiments, messages relating to transactions can be routed to the authorized nodes 102-1 and the node 102-5 to facilitate management of the blockchain. The nodes 102-1 and 102-5 can manage the cryptocurrency blockchain and can therefore know the current state of the blockchain. The blockchain managed by the nodes 102-1 and 102-5 can be distributed within the mesh network 100 including, for example, a state of the blockchain. The nodes 102-1 and 102-5 may also provide access to remote networks and/or the Internet to facilitate communications between any of the nodes 102 and remote device operating outside of the mesh network 100. In various embodiments, as shown in FIG. 1, the unauthorized nodes 102-2, 102-3, and 102-4 can funnel or route all traffic—for example, any type of communication or transactional information—to the authorized nodes 102-1 and 102-5.

In various embodiments, the mesh network 100 can operate without being under the control of a central authority. Instead, the mesh network 100 can be facilitated by several distributed authorized nodes (e.g., the nodes 102-1 and 102-5) that manage a payment system (e.g., cryptocurrency blockchain) that can be used to conduct transactions on the mesh network 100, with other nodes on the mesh network 100 routing transactional related traffic to the authorized nodes to earn payments, and routing secure communications between nodes to also earn payment. Communications can be made secure using private and/or public keys associated with generated cryptocurrency wallets as issued by the authorized nodes as described herein. For example, the public and/or private keys associated with the cryptocurrency wallets can be used to encrypt and decrypt messages sent within the mesh network to maintain the messages in a secure manner as described herein.

In various embodiments, a node 102 may join the mesh network 100 but may have limited capabilities within the mesh network 100 as regulated and controlled by the authorized nodes 102-1 and 102-5. In various embodiments, a node may only be allowed to participate on the mesh network 100 after having a certain amount of cryptocurrency stored in an associated wallet, by receiving authorization to participate from one of the authorized nodes 102-1 and 102-5, or by helping to facilitate a certain number of transactions (e.g., passing messages relating to financial transactions or verifying a requested transaction) or helping to facilitate transfer of data communications (e.g., by transferring or routing communications unrelated to a financial transaction to an authorized node).

In various embodiments, an unauthorized node can be elevated to an authorized node in a similar manner—i.e., by meeting certain criteria such as, for example, by having a certain amount of cryptocurrency stored in an associated wallet, by receiving full authorization from one of the existing authorized nodes 102-1 and 102-5, or by helping to facilitate a certain number of transactions (e.g., passing messages relating to financial transactions or verifying a requested transaction) or helping to facilitate transfer of data communications (e.g., by transferring or routing communications unrelated to a financial transaction to an authorized node).

In various embodiments, an unauthorized node—such as the node 102-2—may be limited to routing any communications or messages of any type to only authorized nodes (such as the nodes 102-1 and 102-5). In various embodiments, an authorized node—such as the node 102-1—may be able to route any communication or message of any type to any adjacent or next neighbor node—for example, a node that is in closest proximity to the node 102-1 (e.g., geographically determined or closest based on a measured distance to the node). In various embodiments, the authorized nodes 102-1 and 102-5 and/or the mesh network 100 can operate according to a proof-of-stake (POS) algorithm. The authorized nodes 102-1 and 102-5 can then operate to maintain the security of the mesh network 100 for facilitating communication within the mesh network 100 while also providing a payment system within the mesh network 100 that can be used by all participating nodes.

Figure 2:
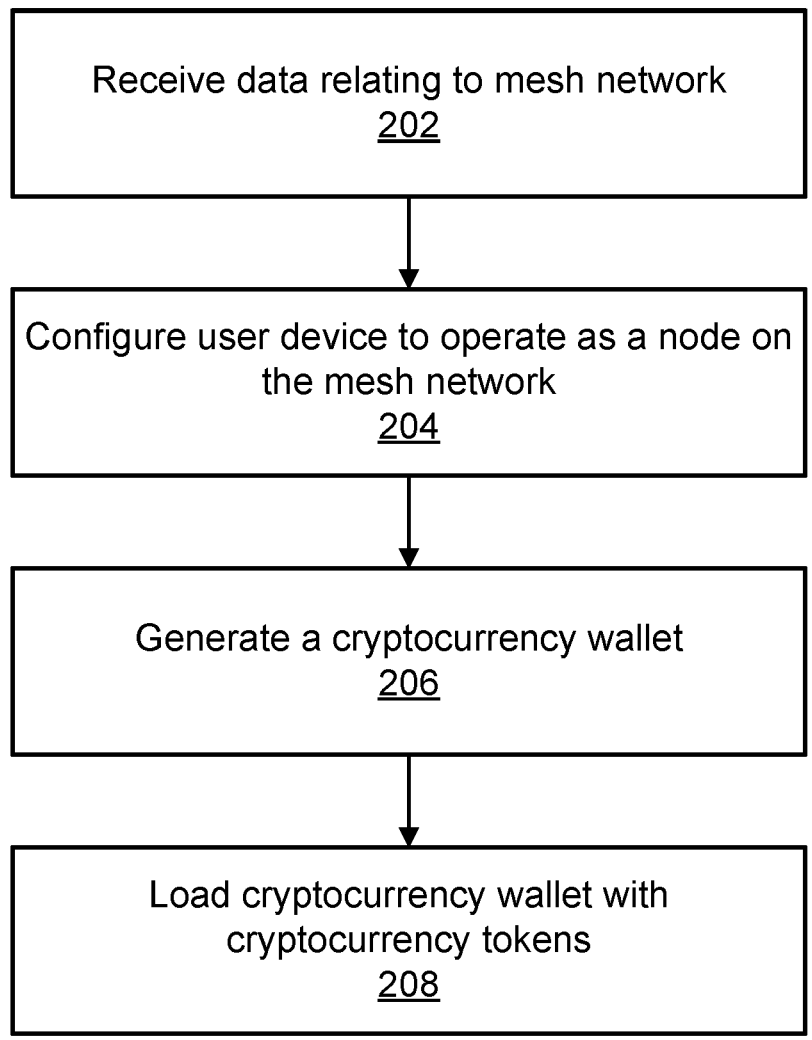
FIG. 2 illustrates a first logic flow.

FIG. 2 illustrates an example of a logic flow 200 that may be representative of techniques for enabling a computing device (or electronic device) of a user to operate as a node on a mesh network and to generate a cryptocurrency wallet to facilitate the use of cryptocurrency tokens. For example, the logic flow 200 may be representative of operations that may be performed in various embodiments by any constituent component of the mesh network 100 (e.g., any of the nodes 102 such as the node 102-1) depicted in FIG. 1.

At 202, the computing device of the user can receive data relating to a mesh network. The computing device can store the received data in a storage device (e.g., a memory component) of the computing device. The computing device can be, for example, a smartphone. The user can be, for example, an attendee of an event or visitor of a venue associated with the mesh network. The mesh network can be, for example, the mesh network 100. The event or venue can be, for example, a farmer's market or a festival having limited or no Internet access. In various embodiments, the user can download an app to her smartphone. The app can include or can be used to receive the data relating to the mesh network.

At 204, the computing device can be configured to operate as a node on the mesh network 100 based on the stored received data. In various embodiments, the downloaded app can be used to establish the smartphone as capable of operating as a node on the mesh network (e.g., as the node 102-1). At 204, the node 102-1 can operate within the mesh network 100.

At 206, the node can generate a cryptocurrency wallet. The cryptocurrency wallet can be stored in the storage device of the node. The cryptocurrency wallet can be issued by an authorized node of the mesh network. As an example, the node 102-5 can authorize and issue the cryptocurrency wallet of the node 102-1.

At 208, the node can load the generated cryptocurrency wallet with an initial amount of cryptocurrency tokens. The initial amount of cryptocurrency tokens can be loaded into the generated cryptocurrency wallet by direct interaction with an authorized node of the mesh network. For example, the node 102-1 can provide a payment directly to the authorized node 102-5 such that the authorized node 102-5 issues a corresponding amount of cryptocurrency (e.g., cryptocurrency tokens) to the node 102-1.

In various embodiments, at 208, the node 102-1 can be considered to be an authorized node based on the amount of cryptocurrency loaded into the wallet of the node 102-1. For example, the amount of cryptocurrency can exceed a pre-determined threshold that is required to ensure a node will be considered to be an authorized node.

After 208, as an example, the node 102-1 can conduct a transaction with any other node operating on the mesh network 100 and/or can facilitate transactions between any other nodes operating on the mesh network 100 as described herein. In various embodiments, the node 102-1 may be limited to conducting transactions and/or communicating with authorized nodes of the mesh network 100.

In various embodiments, the node 102-1 may be capable of operating on the mesh network 100 but is not authorized to do so until meeting one or more criteria. In various embodiments, an authorized node is required to confirm the ability of the node 102-1 to participate on the mesh network 100 as an authorized node. In various embodiments, the node 102-1 can be authorized to participate on the mesh network 100 as an authorized node based on a total number of cryptocurrency tokens (e.g., a total value of cryptocurrency or total number of cryptocurrency tokens) stored in the cryptocurrency wallet of the node 102-2. In various embodiments, the node 102-2 can be authorized to participate on the mesh network 100 based on a total number of transfers conducted by the node 102-2. As described herein, a transfer can include transmission of data communications and/or transactional data to facilitate communication between any two nodes 102 and/or facilitate a transaction between any two nodes 102 as described herein.

Figure 3:
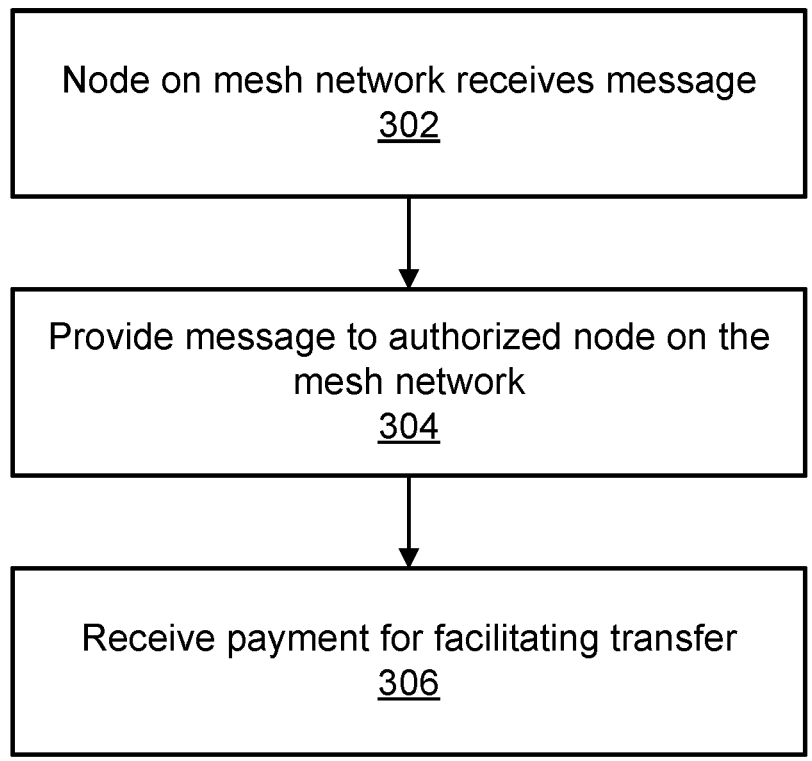
FIG. 3 illustrates a second logic flow.

FIG. 3 illustrates an example of a logic flow 300 that may be representative of techniques for a node processing a transaction on a mesh network. For example, the logic flow 300 may be representative of operations that may be performed in various embodiments by any constituent component of the mesh network 100 (e.g., any of the nodes 102 such as the node 102-2) depicted in FIG. 1.

At 302, a node 102 (e.g., the node 102-2) on the mesh network 100 can receive a message. The message can include data related to a transaction between two other nodes on the mesh network 100 or data related to a communication between two other nodes on the mesh network 100 (e.g., between the nodes 102-1 and 102-5). The message can be considered to be a transfer message or a transfer since the node 102-2 is not a party to the transaction and is not the ultimate intended recipient of the communication.

The transactional data can relate to a transaction involving other nodes on the mesh network 100. The transactional data can relate to a request for a transaction or an acknowledgement or an acceptance of a requested transaction. As an example, the message containing the transactional data can be transmitted by the node 102-1 with the intent of the transactional data being provided to the node 102-5.

At 304, the node 102-2 can determine that the message containing the communication data or the transaction data is intended for the node 102-5 and/or involves a transaction relating to the node 102-5. Accordingly, in accordance with an operation on the mesh network 100, the node 102-2 can forward the message containing the transactional data to the node 102-5. In various embodiments, the node 102-2 can generate a new message that contains the received data.

In various embodiments, the node 102-2 can be considered a facilitating node or an intermediate node since it is not a party to the transaction or an originator or end recipient of the communication but helps facilitate the transaction or communication by routing message, data, or information related to the transaction or the communication to other intermediate nodes and/or the nodes that are parties to the transaction. In various embodiments, the node 102-1 can be considered to be a first party to the transaction and/or a requesting node of the transaction. In various embodiments, the node 102-5 can be considered to be a second party to the transaction and/or a responding node of the transaction. In various embodiments, the node 102-1 can be considered an originator of the communication message and the node 102-5 can be considered to be an ultimate or end recipient of the communication message. In various embodiments, receiving a message containing either communication data or transaction data and forwarding the message to a next node or to an authorized node can be considered processing a transfer or transfer message.

At 306, the node 102-2 can receive a payment for facilitating the transfer between the node 102-1 and the node 102-5. In various embodiments, the payment to the node 102-2 can be based on the number of times the node 102-2 receives and/or transmits data related to a particular transaction and/or receives and/or transmits communication messages between the node 102-1 and the node 102-5. In various embodiments, the payment to the node 102-2 can be based on an amount of data related to the transaction or communication message that the node 102-2 receives and/or transmits.

In various embodiments, the payment to the node 102-2 can be made with cryptocurrency funds (e.g., tokens) of the node 102-1 and/or the node 102-5. In various embodiments, a portion of a cryptocurrency token can be provided to the node 102-2 each time the node 102-2 transmits data related to a transaction or communication message to a next nearest node on the mesh network 100 or to an authorized node. The node 102-2 can then store the received portion of the cryptocurrency token within the generated cryptocurrency wallet of the node 102-2.

In various embodiments, payment to the node 102-2 can be based on supporting any portion of a transaction such as, for example, verifying funds (e.g., cryptocurrency tokens or resources of the node 102-1 within the mesh network 100) and/or facilitating any blockchain management operations on the mesh network 100. In various embodiments, payment to the node 102-2 can be based on supporting any type of communication or traffic between any entity or device, including a remote device, and a node 102 operating on the mesh network 100. As an example, payment to the node 102-2 can be based on data traffic funneled or routed to a particular node—for example, the node 102-4—from any other node 102 on the mesh network 100 or any entity capable or communicating with the node 102-4 from outside of the mesh network 100 through an authorized node (e.g., the node 102-1).

Figure 4:
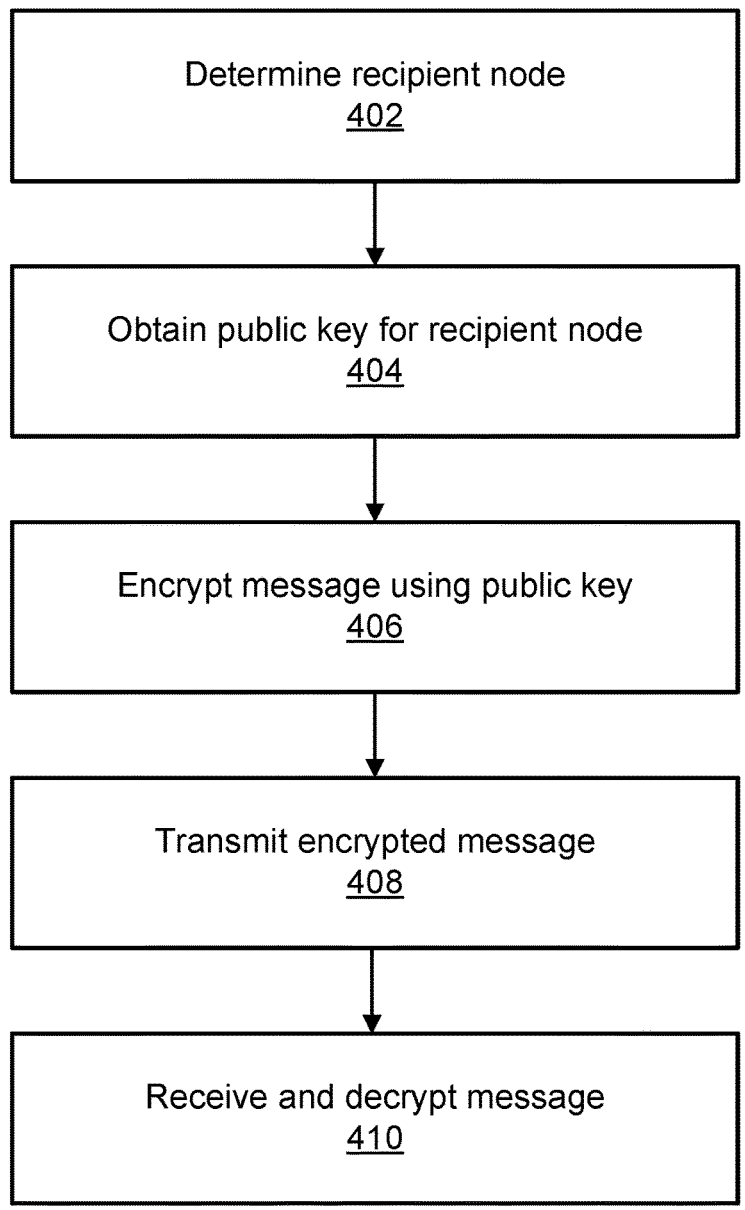
FIG. 4 illustrates a third logic flow.

FIG. 4 illustrates an example of a logic flow 400 that may be representative of techniques for a message encryption and sending process over a mesh network. For example, the logic flow 400 may be representative of operations that may be performed in various embodiments by any constituent component of the mesh network 100 (e.g., any of the nodes 102 such as the node 102-1) depicted in FIG. 1.

At 402, a node (e.g., originating node) can determine a recipient node (e.g., the node 102-2). In various embodiments, the creator of the message (e.g., a user of the computing device operating as the node 102-2) may provide identifying information for the recipient such as, for example, a name, a user name, an email address, a phone number, or public key for a blockchain, and/or other information.

At 404, the originating node can obtain a public key for the recipient node. The public key for the recipient key can be known to the nodes 102 operating on the mesh network 100. In various embodiments, a blockchain maintained on the mesh network 100 (e.g., by the node 102-1) may contain a record of a transaction involving the recipient node that includes the public key of the recipient node. In various embodiments, an authorized node of the mesh network 100 may maintain a listing of public keys for other nodes operating on the mesh network 100.

At 406, the node may encrypt the message using the public key. In various embodiments, the encrypted message may be decipherable only to a user who and/or device that has the private key associated with the public key.

At 408, the encrypted message can be transmitted by the node. If the node is an authorized node, the node can transmit the message to another node on the mesh network with few if any restriction (e.g., to a next nearest neighbor node). If the node is not an authorized node, then the node may be required to only transmit the encrypted message to an authorized node.

At 410, the encrypted message can be received by an intended recipient node. The node can use a private key to decrypt all or a portion of the encrypted message. The recipient node can determine if it is the ultimate recipient for the message or if the message is to be forwarded or transmitted to another node within the mesh network. If the message is to be transmitted on to another node, the recipient node can implement the prior steps to encrypt the message for the next recipient. This process can be repeated until the message is provided to an ultimate recipient.

By using the private and/or public keys of the cryptocurrency wallets of the nodes of the mesh network 100, secure communications over the mesh network 100 can be provided. Accordingly, communication traffic within the mesh network between any nodes allowed to transfer communication messages can be encrypted end-to-end (e.g., from the originator node, through any intermediate nodes, and on to the destination node). Even if one or more nodes along the communication message path become compromised, the communicated traffic within the mesh network 100 can remain secure given the encryption features provided. Additionally, communicated traffic that exits the mesh network 100 will typically be passed through one or more intermediate nodes before exiting the mesh network 100. Accordingly, the communicated traffic can remain anonymous as the source of the original message may not be able to be identified due to the encryption features of the mesh network 100.

Overall, the mesh network 100 can be an encrypted and therefore secure network. Entry onto the mesh network 100 can be controlled and limited. In various embodiments, only authorized nodes on the mesh network 100 can allow new participants onto the network. Further, the identity of nodes originating communication traffic can be anonymous, and transactions can be conducted within the mesh network among participants. In this way, the mesh network 100 provide the secure transfer of communication data and transactional data including the transfer of funds.

Figure 5:
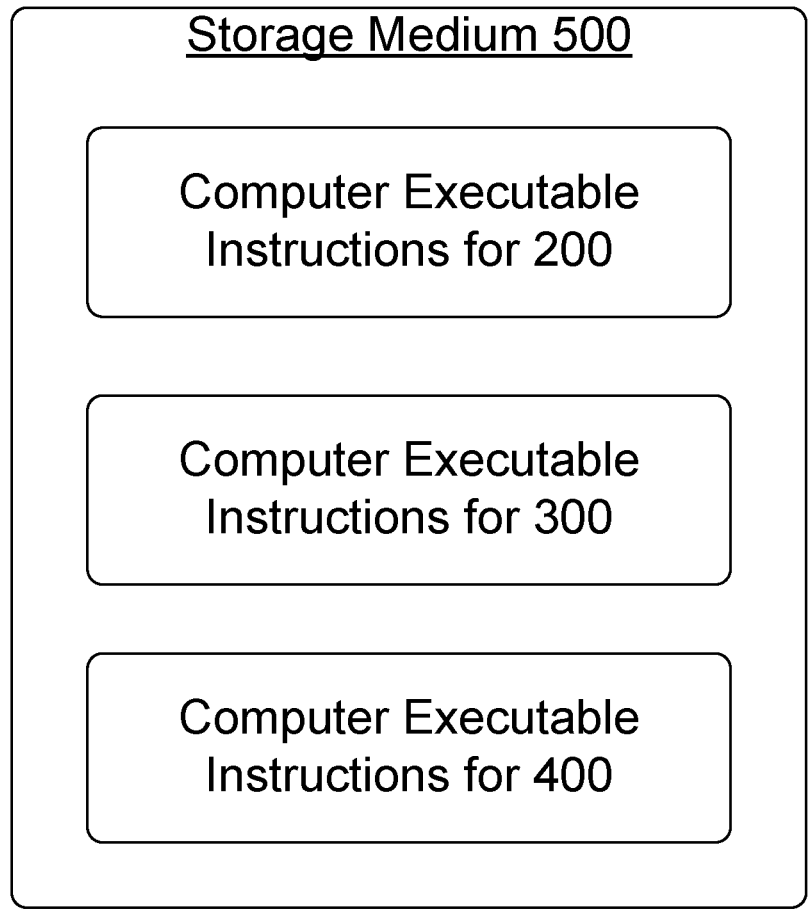
FIG. 5 illustrates a storage medium.

FIG. 5 illustrates a storage medium 500. Storage medium 500 may represent an implementation of a storage device of any electronic device and/or computing device that may operate as a node within the mesh network 100 of FIG. 1. The storage medium 500 can comprise any non-transitory computer-readable storage medium or machine-readable storage medium. In various embodiments, the storage medium 500 can comprise a physical article of manufacture. In various embodiments, storage medium 8500 can store computer-executable instructions, such as computer-executable instructions to implement one or more of logic flows or operations described herein, such as the logic flow 200 of FIG. 2, the logic flow 300 of FIG. 3, and/or the logic flow 400 of FIG. 4. In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
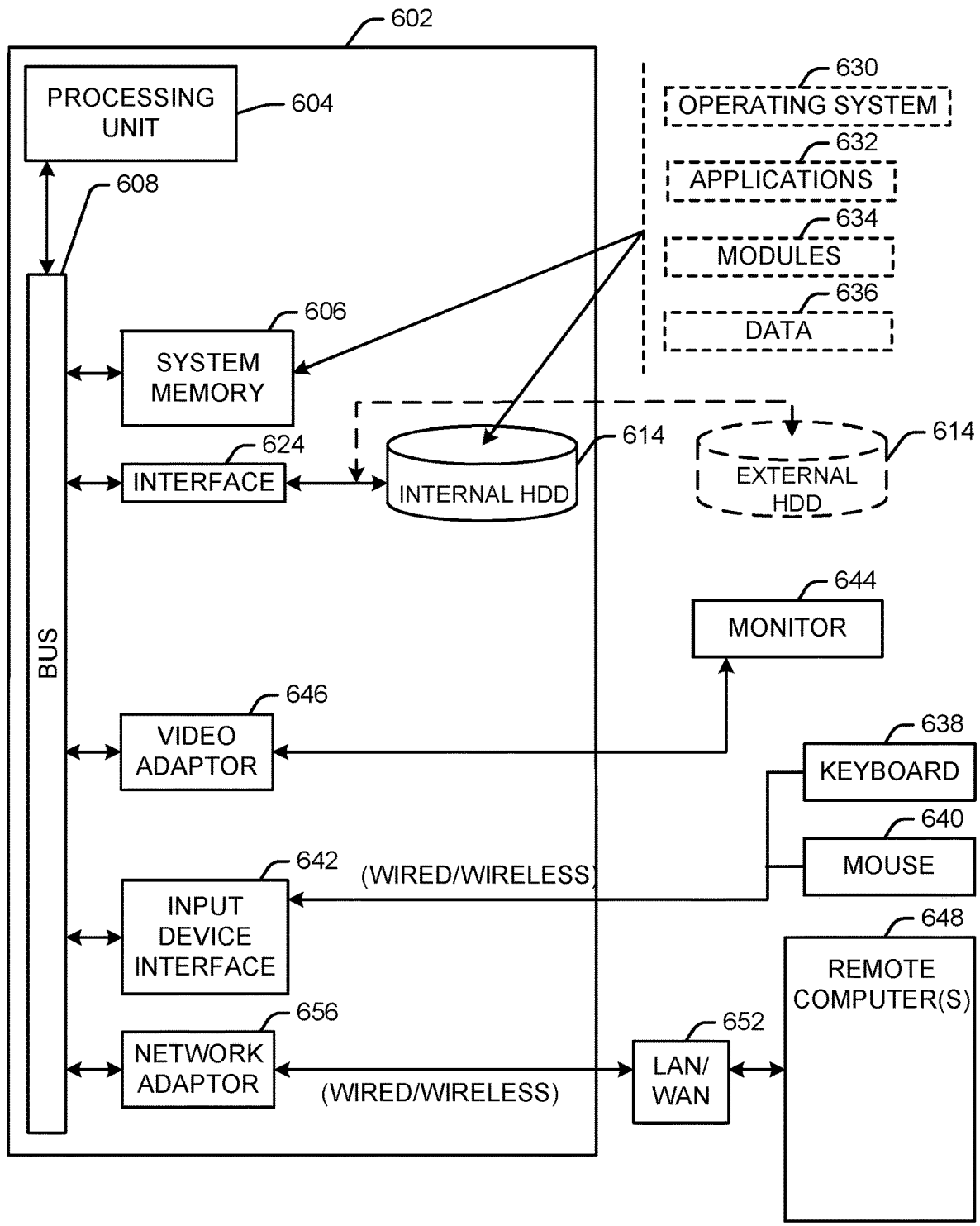
FIG. 6 illustrates a computing architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of the mesh network 100 depicted in FIG. 1. One or more of the constituent components of the computing architecture 600, and/or any constituent component of the mesh network 100, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624.

In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

Figure 7:
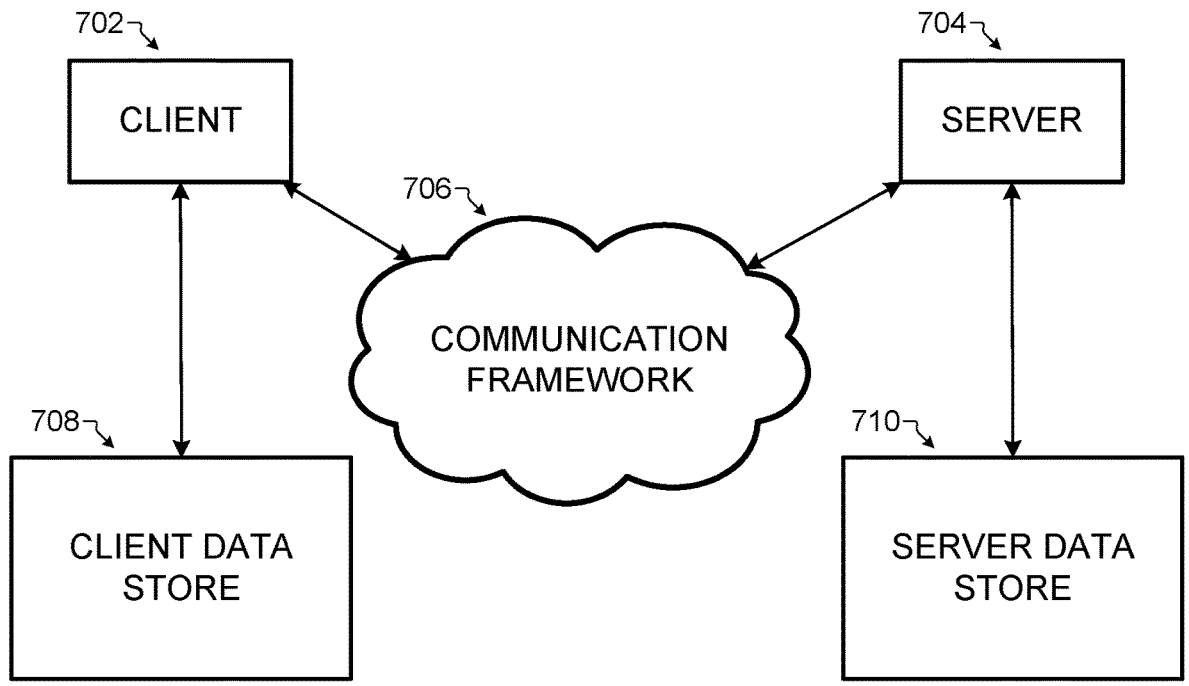
FIG. 7 illustrates a communication architecture.

FIG. 7 illustrates a block diagram of a communication architecture 700. The communication architecture 700 can implement various embodiments described herein. As shown in FIG. 7, the communication architecture 700 comprises one or more clients 702 and servers 704. One of the clients 702 and/or one of the servers 704 can represent any constituent component of the mesh network 100 depicted in FIG. 1.

The client 702 and the server 704 can be operatively connected to a client data store 708 and a server data store 710, respectively, that can be employed to store information local to the respective client 702 and server 704. In various embodiments, the client 702 and/or the server 704 can implement one or more of logic flows or operations described herein.

The client 702 and the server 704 can communicate data or other information between each other using a communication framework 706. The communications framework 706 can implement any known communications technique or protocol. The communications framework 706 can be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators), or any combination thereof. The communications framework 706 can operate over any communication media according to any networking technology including any wired or wireless communications standard or protocol, or any combination thereof.

Figure 8:
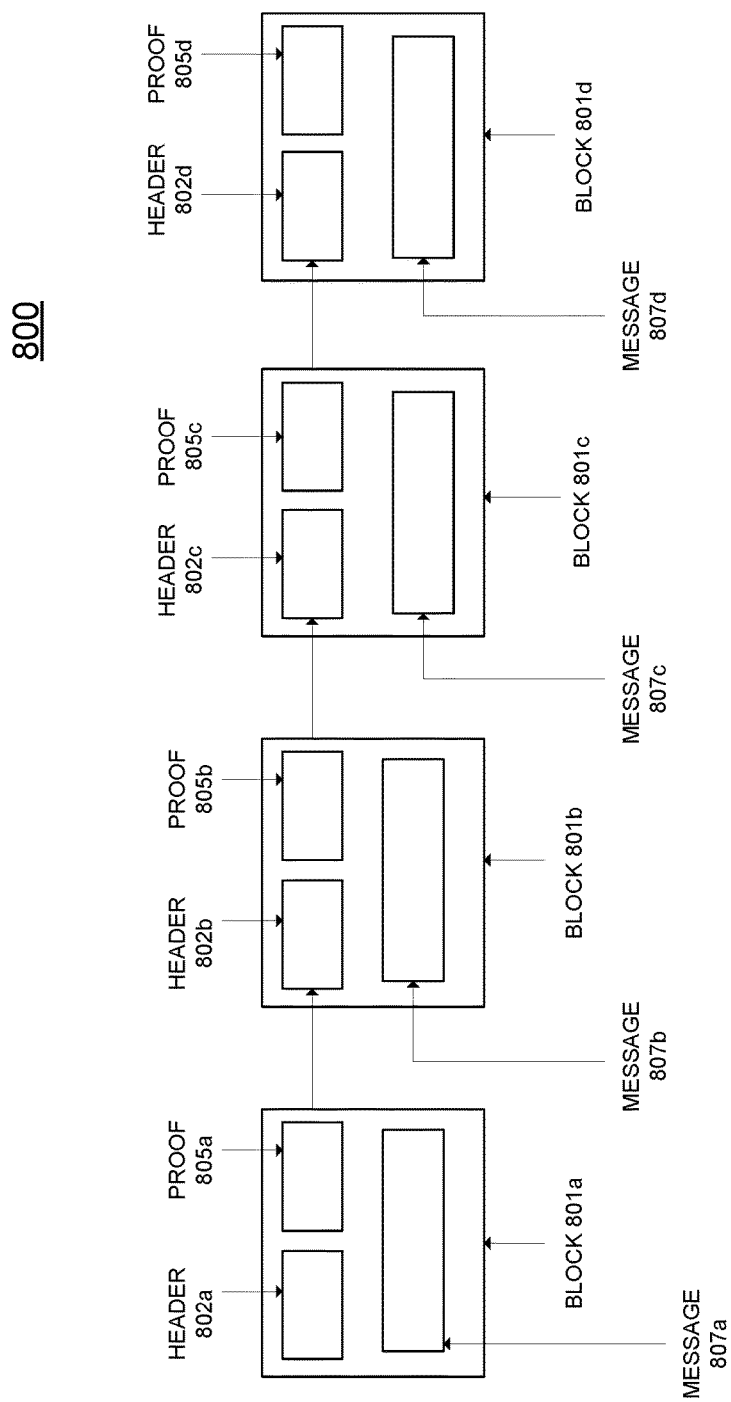
FIG. 8 illustrates a logical model of a blockchain.

FIG. 8 depicts a logical model 800 of an exemplary blockchain, consistent with disclosed embodiments. The blockchain may comprise blocks, such as blocks 801a-801d. Blocks may include messages, such as message 807a-807d. Generally, blocks may include a header, such as headers 802a-802d, which uniquely identifies each block. The headers 802a-802d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, blocks added to a blockchain described herein may satisfy at least one of a proof-of-work condition and a digital signature condition. For example, the headers 802a-802d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using an available key. The blocks may also include proof components, such as proof components 805a-805d. As an example, the nonce can comprise the proof components 805.

Figure 9:
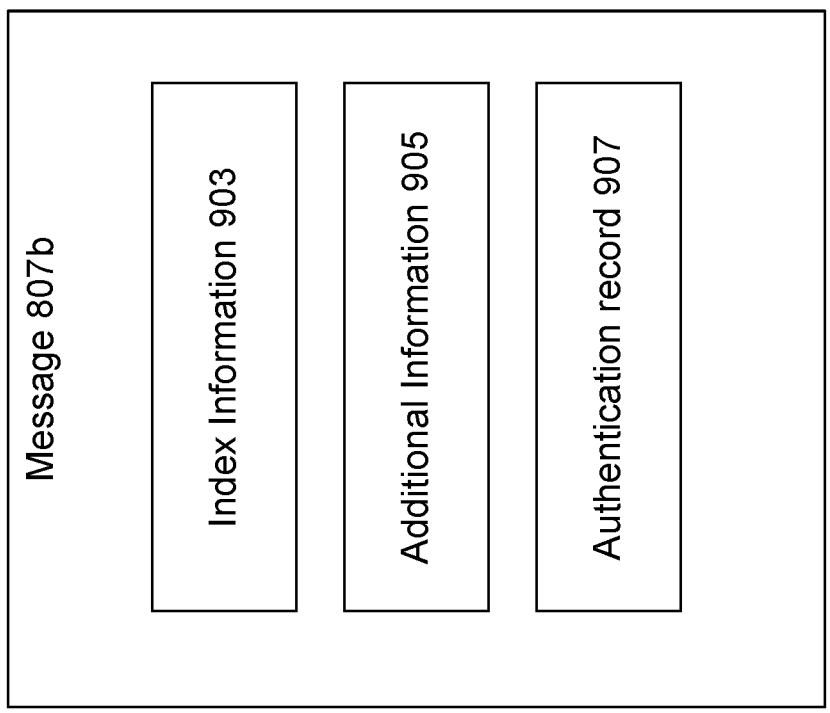
FIG. 9 illustrates a logical model of a message stored in the blockchain of FIG. 8.

FIG. 9 depicts a logical model of a message 807b stored in a blockchain (e.g., an element of blockchain depicted in FIG. 8), consistent with disclosed embodiments. In some embodiments, message 807b may comprise index information 903. In certain aspects, index information 903 may comprise information identifying a user. For example, index information 903 may be at least one of a full name, email address, phone number, or other non-sensitive personal information of the user. In various aspects, index information 903 may include one or more references to earlier blocks in the private blockchain. For example, index information 903 may include one or more references to one or more earlier blocks associated with the same user. A reference may include, as a non-limiting example, a hash of a preceding block in the blockchain associated with the same user. In some aspects, index information 903 may be obfuscated or encrypted according to methods known to one of skill in the art. For example, index information 903 may be encrypted with a cryptographic key. As an additional example, index information 903 may comprise a hash of the at least one of a full name, email address, phone number, or other non-sensitive personal information of the user.

Message 807b may comprise additional information 905, consistent with disclosed embodiments. The additional information 905 can be, for example, metadata or other information related to a transaction conducted between nodes in the mesh network 100 (e.g., may provide public keys for certain nodes operating in the mesh network 100). In various aspects, additional information 905 may be obfuscated or encrypted according to methods known to one of skill in the art.

Message 807b may comprise authentication record 907, consistent with disclosed embodiments. In some aspects, authentication record 907 may comprise information enabling subsequent auditing of transactions. For example, authentication record 907 may identify at least one node of the mesh network 100. In some aspects, authentication record 907 may be obfuscated or encrypted according to methods known to one of skill in the art. For example, authentication record 907 may be encrypted with a cryptographic key.

Cryptographic keys may be used to encrypt elements of messages in blocks, consistent with disclosed embodiments. In some aspects, such cryptographic keys may be associated with nodes of the mesh network 100. In various aspects, at least some of the cryptographic keys may be associated with authorized nodes. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element, or when an element of a message in a block is encrypted with a public key, a corresponding private key may be available for decrypting the encrypted element.

Various embodiments described herein may comprise one or more elements. An element may comprise any structure arranged to perform certain operations. Each element may be implemented as hardware, software, or any combination thereof. Any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

In various instances, for simplicity, well-known operations, components, and circuits have not been described in detail so as not to obscure the embodiments. It can be appreciated that the specific structural and functional details disclosed herein may be representative and do not necessarily limit the scope of the embodiments.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

The invention claimed is:

1. An electronic device, comprising:
a storage device to store instructions; and
a processor coupled with the storage device operable to execute the instructions, the processor, when executing the instructions, to:
receive a first message from a first node on a distributed mesh network, the first message encrypted with a public key associated with the electronic device, wherein the electronic device is an authorized node;
generate a decrypted message by decrypting the first message with a private key associated with the electronic device;
request a public key of a cryptocurrency wallet of a second node on the distributed mesh network from an authorization node based on the decrypted message;
receive the public key of the cryptocurrency wallet of the second node;
generate a re-encrypted message by encrypting the decrypted message with the public key of the cryptocurrency wallet of the second node;
send the re-encrypted message to the second node;
receive a payment, based on routing the first message, wherein the first message comprises communication data or transaction data, from a cryptocurrency wallet of an originating node that generated the communication data or transaction data, wherein the originating node is an unauthorized node;
store the payment from the originating node in a cryptocurrency wallet of the electronic device;
update a cryptocurrency blockchain based on the payment;
determine that the originating node on the distributed mesh network can participate as another authorized node, based on an amount of cryptocurrency held in a cryptocurrency wallet of the originating node or a number of transactions associated with the cryptocurrency wallet of the originating node; and
after determination that the originating node can participate as another authorized node, distribute the updated cryptocurrency blockchain to the originating node.

2. The electronic device of claim 1, the processor to:
receive data relating to the distributed mesh network; and
establish the electronic device as a node on the distributed mesh network based on the data.

3. The electronic device of claim 1, the processor to receive authorization to participate on the distributed mesh network from the authorization node, wherein the authorization node maintains the cryptocurrency blockchain to provide access to the Internet for the distributed mesh network.

4. The electronic device of claim 1, the processor to:
obtain the cryptocurrency wallet of the electronic device and store the cryptocurrency wallet of the electronic device in the storage device, wherein the cryptocurrency wallet of the electronic device is associated with the public key and the private key associated with the electronic device; and
store the payment in the cryptocurrency wallet of the electronic device in the storage device.

5. The electronic device of claim 3, wherein the authorization received to participate on the distributed mesh network is based on a total amount of cryptocurrency tokens stored in the cryptocurrency wallet of the electronic device.

6. The electronic device of claim 1, wherein the public key of the cryptocurrency wallet of the second node is stored within the cryptocurrency blockchain of the distributed mesh network.

7. The electronic device of claim 1, wherein the first message comprises the transactional data, and wherein the payment is received from a third node of the distributed mesh network initiating the transaction involving a cryptocurrency token.

8. The electronic device of claim 1, wherein the first message comprises the communication data, and wherein the payment is received from the originating node of the distributed mesh network generating the communication data.

9. The electronic device of claim 1, wherein the first message comprises the transaction data associated with a transaction and the payment is responsive to processing the transaction, the processor further to receive a second payment for maintaining the cryptocurrency blockchain.

10. A computer-implemented method, comprising:
    receiving, by an electronic device, a first message from a first node on a distributed mesh network, the message encrypted with a public key associated with the electronic device, wherein the electronic device is an authorized node;
    generating, by the electronic device, a decrypted message by decrypting the first message with a private key associated with the electronic device;
    requesting, by the electronic device, a public key of a cryptocurrency wallet of a second node on the distributed mesh network from an authorization node based on the decrypted message;
    receiving, by the electronic device, the public key of the cryptocurrency wallet of the second node;
    generating, by the electronic device, a re-encrypted message by encrypting the decrypted message with the public key of the cryptocurrency wallet of the second node;
    sending, by the electronic device, the re-encrypted message to the second node;
    receiving, by the electronic device, a payment, based on routing the first message, wherein the first message comprises communication data or transaction data, from a cryptocurrency wallet of an originating node that generated the communication data or transaction data, wherein the originating node is an unauthorized node; and
    storing, by the electronic device, the payment from the originating node in a cryptocurrency wallet of the electronic device;
    updating, by the electronic device, a cryptocurrency blockchain based on the payment;
    determining, by the electronic device, that the originating node on the distributed mesh network can participate as another authorized node based on an amount of cryptocurrency held in a cryptocurrency wallet of the originating node or a number of transactions associated with the cryptocurrency wallet of the originating node; and
    after determination that the originating node can participate as another authorized node, distributing, by the electronic device, the updated cryptocurrency blockchain to the originating node.

11. The computer-implemented method of claim 10, comprising:
    receiving data relating to the distributed mesh network; and
    establishing the electronic device as a node on the distributed mesh network based on the data.

12. The computer-implemented method of claim 10, comprising receiving authorization to participate on the distributed mesh network from the authorization node, wherein the authorization node maintains the cryptocurrency blockchain to provide access to the Internet for the distributed mesh network.

13. The computer-implemented method of claim 10, comprising:
    obtaining the cryptocurrency wallet of the electronic device and storing the cryptocurrency wallet of the electronic device in a storage device, wherein the cryptocurrency wallet of the electronic device is associated with the public key and the private key associated with the electronic device; and
    storing the payment in the cryptocurrency wallet of the electronic device in the storage device.

14. The computer-implemented method of claim 13, wherein the authorization received to participate on the distributed mesh network is based on a total amount of cryptocurrency tokens stored in the cryptocurrency wallet of the electronic device.

15. The computer-implemented method of claim 13, wherein the public key of the cryptocurrency wallet of the second node is stored within the cryptocurrency blockchain of the distributed mesh network.

16. The computer-implemented method of claim 10, wherein the first message comprises the transactional data, and wherein the payment is received from a third node of the distributed mesh network initiating the transaction involving a cryptocurrency token.

17. The computer-implemented method of claim 10, wherein the first message comprises the communication data, and wherein the payment is received from the originating node of the distributed mesh network generating the communication data.

18. At least one non-transitory computer-readable medium comprising a set of instructions that, in response to being executed on an electronic device, cause the electronic device to:
    receive a first message from a first node on a distributed mesh network, the first message encrypted with a public key associated with the computing device, wherein the electronic device is an authorized node;
    generate a decrypted message by decrypting the first message with a private key associated with the computing device;
    request a public key of a cryptocurrency wallet of a second node from an authorization node based on the decrypted message;
    receive the public key of the cryptocurrency wallet of the second node;
    generate a re-encrypted message by encrypting the decrypted message with the public key of the cryptocurrency wallet of the second node;
    send the re-encrypted message to the second node;
    receive a payment, based on routing the first message, wherein the first message comprises communication data or transaction data, from a cryptocurrency wallet of an originating node that generated the communication data or transaction data, wherein the originating node is an unauthorized node; and
    store the payment from the originating node in a cryptocurrency wallet of the electronic device;
    update a cryptocurrency blockchain based on the payment;

determine that the originating node on the distributed mesh network can participate as another authorized node, based on an amount of cryptocurrency held in a cryptocurrency wallet of the originating node or a number of transactions associated with the cryptocurrency wallet of the originating node; and after determination that the originating node can participate as another authorized node, distribute the updated cryptocurrency blockchain to the originating node.

19. The at least one non-transitory computer-readable medium of claim 18, wherein the instructions further cause the computing device to:

receive data relating to the distributed mesh network; and establish the computing device as a node on the distributed mesh network based on the data.

20. The at least one non-transitory computer-readable medium of claim 18, wherein the instructions further cause the computing device to receive a second payment for maintaining the cryptocurrency blockchain, wherein first message comprises the transaction data associated with a transaction and the payment is responsive to processing the transaction.

* * * * *